United States Patent
Muck

(10) Patent No.: US 12,121,148 B2
(45) Date of Patent: Oct. 22, 2024

(54) VIVARIUM STAND

(71) Applicant: OASE GmbH, Hörstel-Riesenbeck (DE)

(72) Inventor: Thorsten Muck, Ibbenbüren (DE)

(73) Assignee: OASE GmbH, Hörstel-Riesenbeck (DE)

( * ) Notice: Subject to any disclaimer, the term of this patent is extended or adjusted under 35 U.S.C. 154(b) by 112 days.

(21) Appl. No.: 17/828,067

(22) Filed: May 31, 2022

(65) Prior Publication Data

US 2022/0378198 A1 Dec. 1, 2022

(30) Foreign Application Priority Data

May 31, 2021 (DE) ...................... 20 2021 102 969.2

(51) Int. Cl.
*A47B 81/00* (2006.01)
*A01K 63/00* (2017.01)
*A47B 96/20* (2006.01)

(52) U.S. Cl.
CPC ............ *A47B 81/00* (2013.01); *A01K 63/006* (2013.01); *A01K 63/003* (2013.01); *A47B 96/20* (2013.01); *A47B 2200/14* (2013.01); *A47B 2220/00* (2013.01)

(58) Field of Classification Search
CPC . A47B 81/00; A47B 2200/14; A47B 2220/00; A47B 96/20; A01K 63/003; A01K 63/006
See application file for complete search history.

(56) References Cited

U.S. PATENT DOCUMENTS

| | | | | |
|---|---|---|---|---|
| 4,484,682 A | * | 11/1984 | Crow | ................ A45C 13/00 220/636 |
| 5,713,304 A | * | 2/1998 | de Vosjoli | ............ A01K 63/003 119/501 |
| 2014/0261211 A1 | * | 9/2014 | Tuan | ..................... A01K 61/85 119/51.01 |
| 2016/0345726 A1 | | 12/2016 | Chou | |

FOREIGN PATENT DOCUMENTS

| | | | | |
|---|---|---|---|---|
| CN | 212507853 | | 2/2021 | |
| DE | 4323650 | A1 * | 3/1994 | .......... H01F 7/0268 |
| DE | 44 06 980 | | 1/1995 | |
| DE | 10 2012 000 027 | | 7/2013 | |
| DE | 202012005689 | U1 * | 10/2013 | ............. F16B 12/00 |
| DE | 202013006619 | U1 * | 12/2013 | ............. F16B 12/24 |
| DE | 20 2018 000 024 | | 7/2018 | |
| EP | 2878833 | A1 * | 6/2015 | ............... E06B 3/96 |
| JP | 3067527 | | 1/2000 | |
| WO | 2013/034876 | | 3/2013 | |

* cited by examiner

*Primary Examiner* — Tan Le
(74) *Attorney, Agent, or Firm* — Gudrun E. Huckett

(57) ABSTRACT

A stand for a vivarium has a side wall with a cutout and at least one first magnet closure element arranged adjacent to the cutout. At least one cover is provided that is to be inserted into the cutout and at least partially covers the cutout in an installed position of the at least one cover in the cutout. The at least one cover has at least one second magnet closure element that in the installed position is arranged so as to correspond with the at least one first magnet closure element so that the at least one cover is secured in the cutout exclusively by magnetic forces interacting between the at least one first magnet closure element and the at least one second magnet closure element in the installed position.

7 Claims, 5 Drawing Sheets

VIVARIUM STAND

BACKGROUND OF THE INVENTION

The invention relates to a stand for vivariums, especially aquariums. Stands for vivariums accommodate the technical devices such as devices for illumination control and/or for temperature control required for operation of a vivarium. In particular when used as a stand for aquariums, the stand in addition can accommodate external filters for filtration of the aquarium water. For the technical devices for the aquarium arranged in the interior of the stand, in particular an external filter, electrical supply lines as well as infeed lines for water to be supplied to the aquarium and discharge lines for removal of water from the aquarium must be provided.

Object of the present invention is to provide a stand that provides a passage for these lines that is visually pleasing and particularly simple to handle at the same time.

SUMMARY OF THE INVENTION

In accordance with the invention, this object is solved by a stand with side walls, wherein at least one side wall has a cutout and at least one first magnet closure element arranged adjacent to the cutout. Moreover, the stand comprises at least one cover that can be inserted into the cutout and at least partially closes the cutout in the installed position. The cover comprises a second magnet closure element, wherein the second magnet closure element in the installed position of the cover in the cutout is arranged to correspond with the first magnet closure element. In the installed position, the cover is held exclusively by magnetic forces acting between the first magnet closure element and the second magnet closure element. No additional fixtures such as hinges must be provided or present. Limiting stops for the cover are not required but can be provided for simplifying insertion of the cover in the cutout. The cutout can be of a simple design and, when the cover is removed from the cutout, is free of any fixtures that might impair passage of cables through the cutout. The cover can be inserted in a simple manner into the cutout and removed from the cutout without requiring a tool. Due to the elimination of additional fixtures, such a stand can be produced in a simple manner and provides for a clear and visually pleasing appearance with the cover inserted in the cutout as well as without the cover.

Arranged adjacent to the cutout means in the context of the invention that the first magnet closure element is arranged such that it can magnetically interact with the second magnet closure element of the cover in an installed position, wherein the magnetic forces between the first and the second magnet closure elements are great enough in order to secure the cover in the cutout. The first and/or second magnet closure element is embodied here as a magnetic element, in particular as a permanent magnet. The respective other magnet closure element can also be embodied as a magnetic element, in particular as a permanent magnet. Preferably, the respective other magnet closure element is however embodied from a non-magnetic but magnetizable ferromagnetic element, in particular of a magnetizable steel material.

Preferably, the second magnet closure element is embodied as a non-magnetic but magnetizable element. Thus, the cover element is not magnetic and therefore can be more easily stored. In particular, the cover, when not in use, can be arranged in the interior of the stand without interacting magnetically, for example, with technical devices arranged in the stand of the vivarium, such as illumination control, temperature control or a possibly present filter device. Such a cover can be handled particularly easily.

Advantageously, the first magnet closure element is recessed in an end face of the side wall that delimits the cutout. In this way, the first magnet element can be arranged adjacent to the cutout. At the same time, a simple centering action of the cover by means of the magnetic forces within the cutout is achieved in this way. In addition, this type of arrangement of the first magnet element provides for a visually particularly clear and thus pleasing design of the stand.

Particularly preferred, the second magnet closure element is recessed in a side of the cover that in an installed position of the cover is facing the end face of the side wall that delimits the cutout. This arrangement of the first and second magnet closure elements enables an automatic centering action of the cover in the cutout relative to an outwardly facing surface of the side wall. The cover can be introduced easily into the recess. In addition, this arrangement enables a clear and visually pleasing design of the cover and thus of the stand.

Preferably, the first magnet closure element and the second magnet closure element that is arranged at the cover so as to correspond with the first magnet closure element comprise surfaces which in the installed position are oppositely positioned to each other with approximately identical spatial expansions. When the first magnet closure element and the second magnet closure element comprise oppositely positioned surfaces, in particular cross-sectional surfaces with approximately identical spatial expansions, the centering action of the cover in the installed position is particularly easy not only relative to an outer surface of the side wall but also in a direction parallel to the outer surface. When the first and the second magnet closure elements, for example, comprise round or rectangular cross sections with same surface area, they have the tendency in the installed position to assume a position in which they are precisely aligned above each other. In this way, the installed position of the cover in the cutout can be precisely predetermined in a simple manner.

Alternatively, the first magnet closure element or the second magnet closure element can be designed as an areally extending element. Particularly preferred, this areally extending element is provided of a non-magnetic but magnetizable material. In this alternative embodiment, along the areal extension of the respective magnet closure element, a cover which only partially closes the cutout can be arranged in the cutout in different positions displaced along the areal extension of the magnet closure element.

Preferably, the at least one cover is securable flush with an outer surface of the stand in the cutout. In this way, a particularly clear and visually pleasing design of the stand is enabled. Known covers, which can be inserted in cutouts for the cable passages and are mechanically fixed thereat, have typically stop areas that project past the cutout and with which the cover contacts the outer surface of the side wall. Such a cover thus projects past the surface of the side wall and is necessarily larger than the cutout. In contrast to this, the solution according to the invention, which enables the elimination of contact surfaces, provides for a flush arrangement of the respective outer surfaces of sidewall and cover and as a result enables a visually particularly pleasing appearance of the stand.

Advantageously, the cutout has a rectangular contour and extends horizontally across the entire side wall of the stand. Aquarium stands are designed particularly stable in order to be able to absorb and transmit to the floor the great weight of an aquarium filled with water. Corresponding stands for vivariums that are designed as aquariums have for this purpose a preferably inwardly positioned frame, for example, a steel pipe frame. The load of an aquarium that is placed onto the stand is absorbed by the frame in this context. The side walls of such a stand, in contrast to conventional stands, therefore are no part of the statics of the stand but constitute a cladding element. Therefore, it is possible in a simple manner to provide a cutout in a side wall that extends horizontally across the entire side wall. A rectangular contour of this cutout enables a particularly pleasing appearance of the stand. The cutout or the cover inserted into the cutout can be integrated with a clear and puristic design into the stand.

Preferably, the at least one cover can be secured rotated by 180° about a main axis in the cutout. For this purpose, the cover can have a second magnet closure element extending through the cover or a plurality of second magnet closure elements at oppositely positioned sides of the cover. This results in a particularly simple handling because it is no longer necessary to closely observe a defined orientation of the cover for insertion into the cutout. For a cuboid cover, it is possible to insert the cover rotated by 180° about any of the three main axes of the cuboid into the cutout. The handling of the stand is thus improved. Also, the back side of the cover can be designed visually differently and enables the user in this way to produce visually different variants of the stand.

Preferably, the stand comprises first magnet closure elements on oppositely positioned sides of the cutout, in particular above and below the cutout. In this way, a particularly good seat of the cover in the cutout can be obtained.

Preferably, the stand comprises at least one set of at least two covers of different dimensions that can be inserted into the cutout. In this context, one (first) cover of the set is designed such that it completely closes off the cutout in the installed position. At least one additional (second) cover of the set is designed such that it closes the cutout only partially. When using this additional cover, the stand provides a cable passage in the side wall. The cutout without cover forms a cable passage already. A cable passage is however typically larger for a simple introduction of cables than required for the actual cable in operation. Typically, connection pieces of cables such as plugs are significant larger than the actual cable itself. The additional cover enables to close the cutout after installation of the cable and provide a visually pleasing appearance of the stand. Particularly preferred, the set of covers comprises two preferably identical (second) covers which in the installed position only partially close the cutout. The first and second magnet closure elements are arranged in this context such that the two additional (second) covers can be fixed in the cutout such that they form the cable passage between them. In this way, it is possible to determine not only the size of the cable passage but also the location of the cable passage in the side wall. For example, it is possible to arrange the cable passage centrally in the cutout or, as needed, displace it toward the rear wall.

As a practical configuration, the stand can have at least one further magnet element that is recessed in a wall of the stand, preferably however is recessed at an inner side of a door of the stand that closes the stand. Tools required for servicing the vivarium such as, for example, scissors, can be arranged in a simple manner at such a magnet element. Tools of magnetizable material can be arranged simply at this recessed magnet element and are easily accessible thereat. Tools of non-magnetizable material can be provided with corresponding elements of magnetizable or magnetic material in order to be stored at such a magnet element, in particular at an inner side of a door of the stand. Covers that are not used can also be stored fixedly thereat in the interior of the stand.

BRIEF DESCRIPTION OF THE DRAWINGS

Further advantages and details can be taken from the following figure description.

Figure 1:
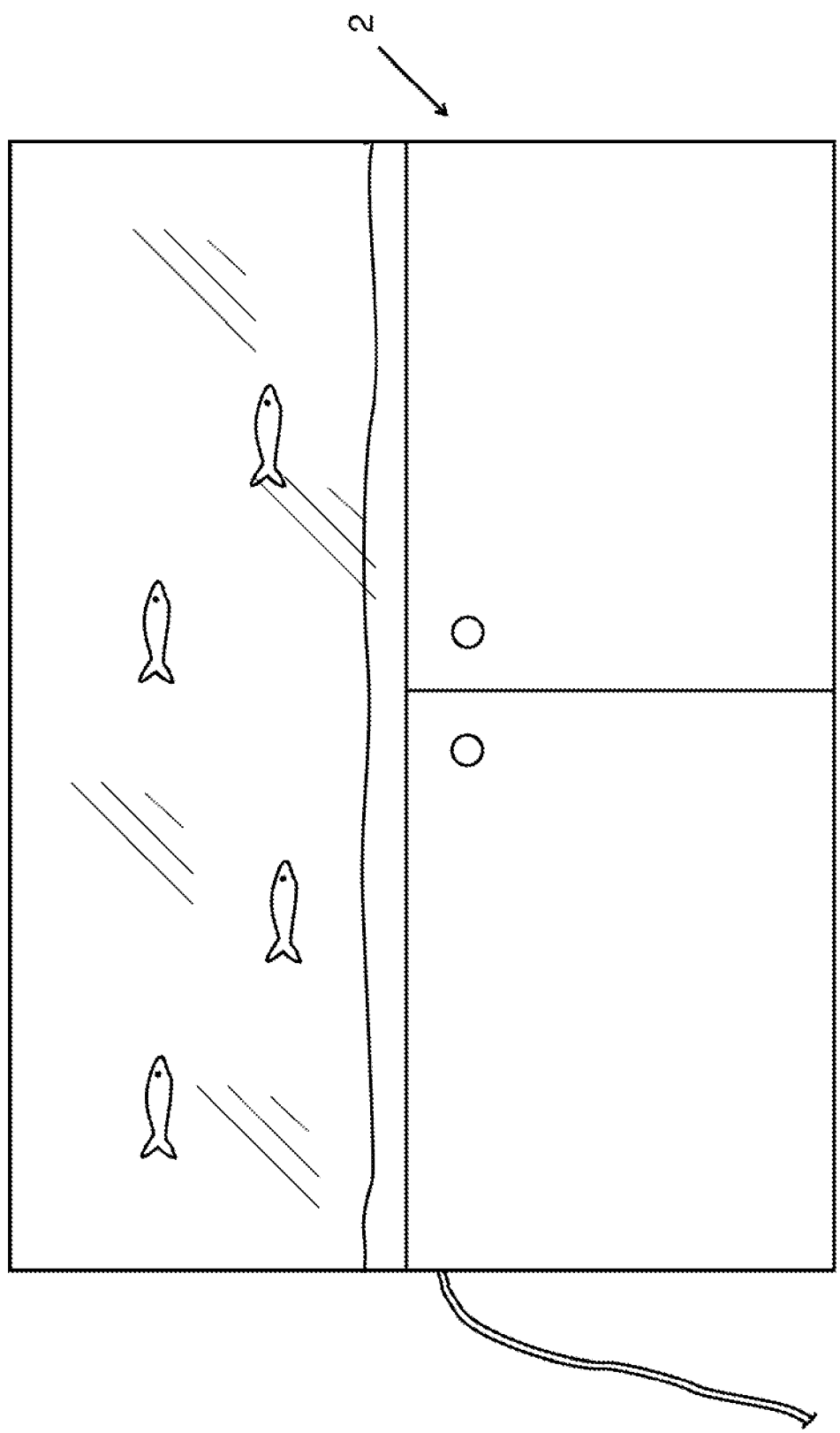
FIG. 1 shows a stand according to the invention for aquariums with an aquarium positioned thereon and a cable passage at the left side, viewed from the front.

Same or similar acting parts are provided with identical reference characters, if expedient. Individual technical features of the embodiments disclosed in the following can be combined with the features of the independent claim as well as with the features of individual afore disclosed embodiments to subject matter in accordance with the invention.

DESCRIPTION OF PREFERRED EMBODIMENTS

FIG. 1 shows a stand 2 according to the invention for vivariums in the form of a stand 2 for an aquarium with an aquarium arranged thereon. At left side in this view, a cable is illustrated that extends into the stand 2 for vivariums.

Figure 2:
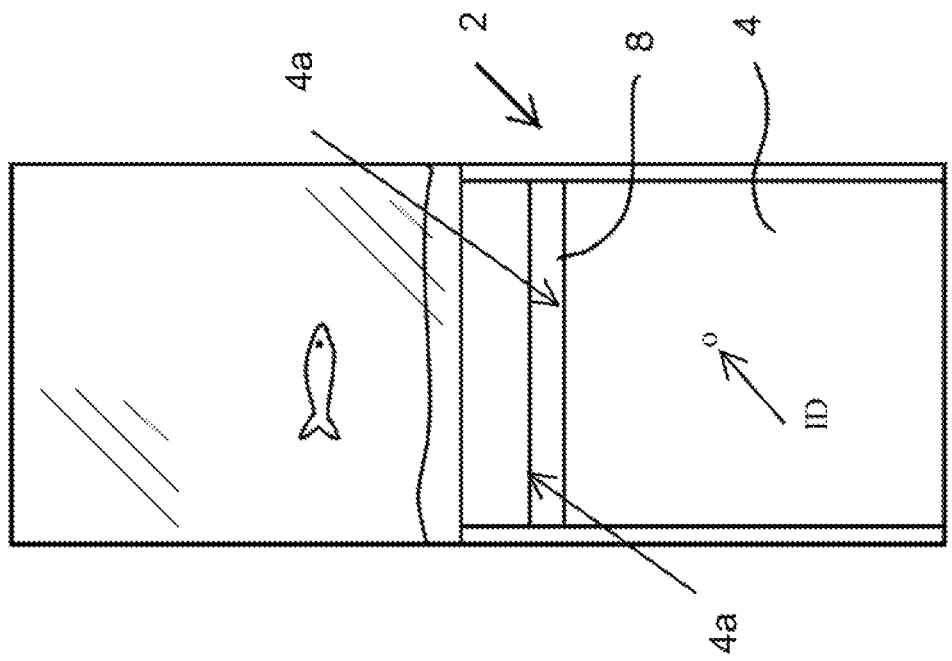
FIG. 2 is a side view of the left side of the stand according to the invention for aquariums according to FIG. 1, wherein the cutout is closed off by a cover completely closing the cutout.

FIG. 2 shows the stand 2 for vivariums according to FIG. 1 in a side view. The stand 2 comprises a side wall 4 in which a cutout 6 is arranged which is delimited by end faces 4a of the side wall 4 facing the cutout 6. The cutout 6 according to FIG. 2 comprises a rectangular contour and extends completely through the side wall 4. In the illustration according to FIG. 2, the cutout 6 is closed off by a cover 8 inserted in insertion direction ID. The cover 8 is embodied such that it closes off the cutout 6 completely in the installed position. The cover 8 is held in the cutout 6 by first magnet closure elements 10 and second magnet closure elements 12.

Figure 3:
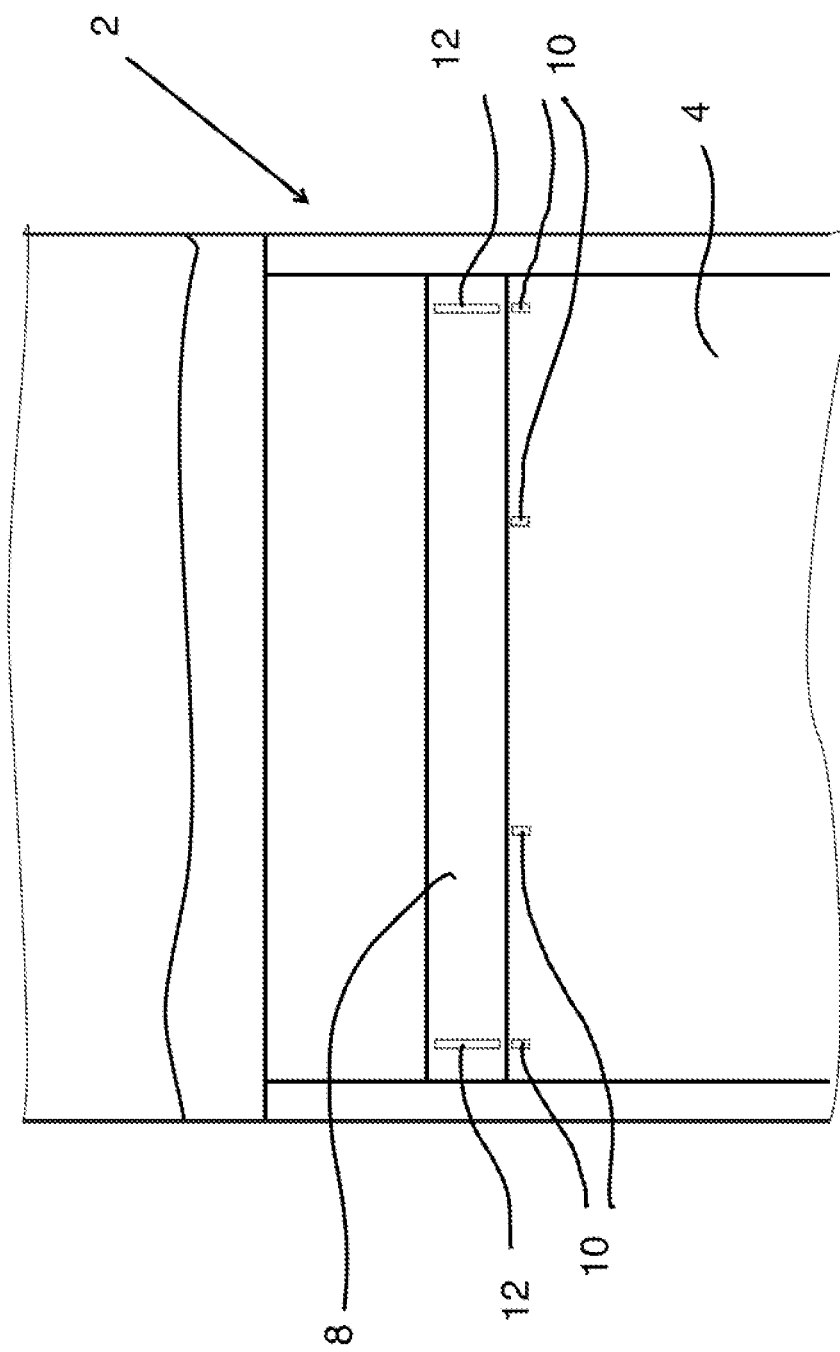
FIG. 3 shows a detail view of the stand for aquariums according to FIG. 2 with an illustration of the first and second magnet closure elements.

FIG. 3 shows the arrangement of the first magnet closure elements 10 and second magnet closure elements 12. In the side wall 4, four first magnet closure elements 10 are arranged below the cutout 6. The first magnet closure elements 10 are arranged immediately adjacent to the cutout 6 at the end face 4a of the bottom part of the side wall 4. The cover 8 comprises two second magnet closure elements 12. The first magnet closure elements 10 are embodied as permanent magnets. The second magnet closure elements 12 are embodied as non-magnetic but magnetizable steel pins which are recessed in the cover 8. The second magnet closure elements 12 are positioned in this context such in the cover 8 that, in an installed position of the cover 8 in the cutout 6, they are positioned opposite one of the first magnet closure elements 10, respectively. The first magnet closure elements 10 and the second magnet closure elements 12 interact with each other such that the cover 8 assumes automatically a certain predefined position in the cutout 6. In this position, the first magnet closure elements 10 and the second magnet closure elements 12 face each other and are arranged coaxially above each other. The cover 8 can be inserted in the insertion direction ID (FIG. 2) without a tool into the cutout 6 as well as, from an interior of the stand 2, can be pushed out of the cutout 6 to the exterior. When no stops for the cover 8 are provided, it can also be pushed out of the cutout 6 from the exterior in the direction toward the interior of the stand 2. In the installed position, the cover 8 is aligned flush with the outer surface of the side wall 4. The cover 8 can be positioned in the cutout 6 rotated by 180° about any of the three main axes. The handling is thus significantly improved because upon insertion into the cutout 6 it is not necessary to observe a precise orientation of the cover 8.

Figure 4:
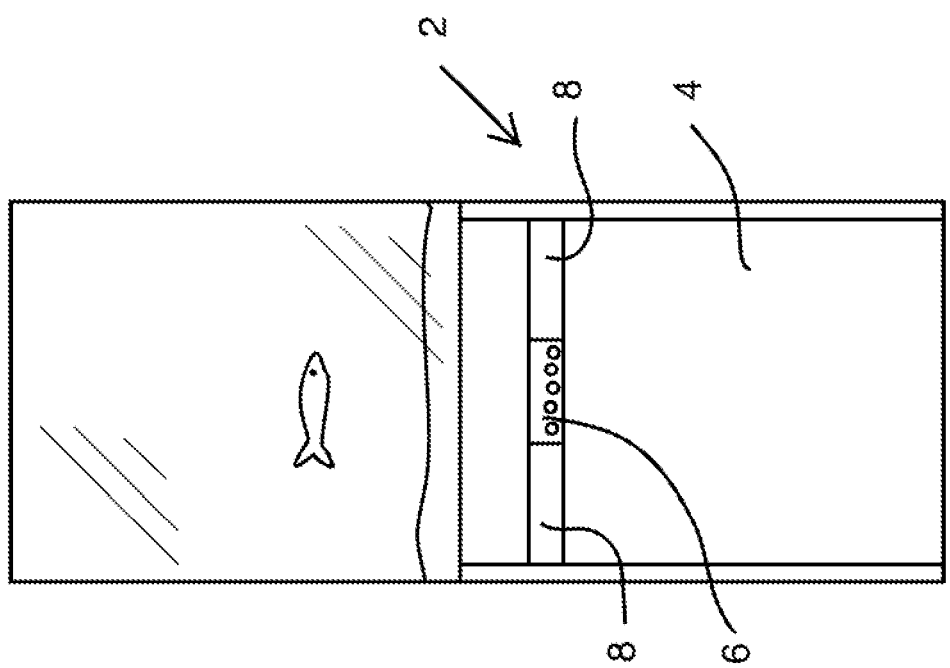
FIG. 4 shows the stand according to the invention of FIG. 1 in which the cutout is closed by two covers that only partially close the cutout and form between them a cable passage.

FIG. 4 shows the stand 2 in a view according to FIG. 2. In FIG. 4, instead of the cutout 6 provided with a cover 8 completely closing the cutout 6, the cutout 6 is closed by two additional (second) covers 8 that only close the cutout 6 partially. The additional (second) covers 8 form between them a cable passage. In FIG. 4, five cables are arranged in the cable passage.

Figure 5:
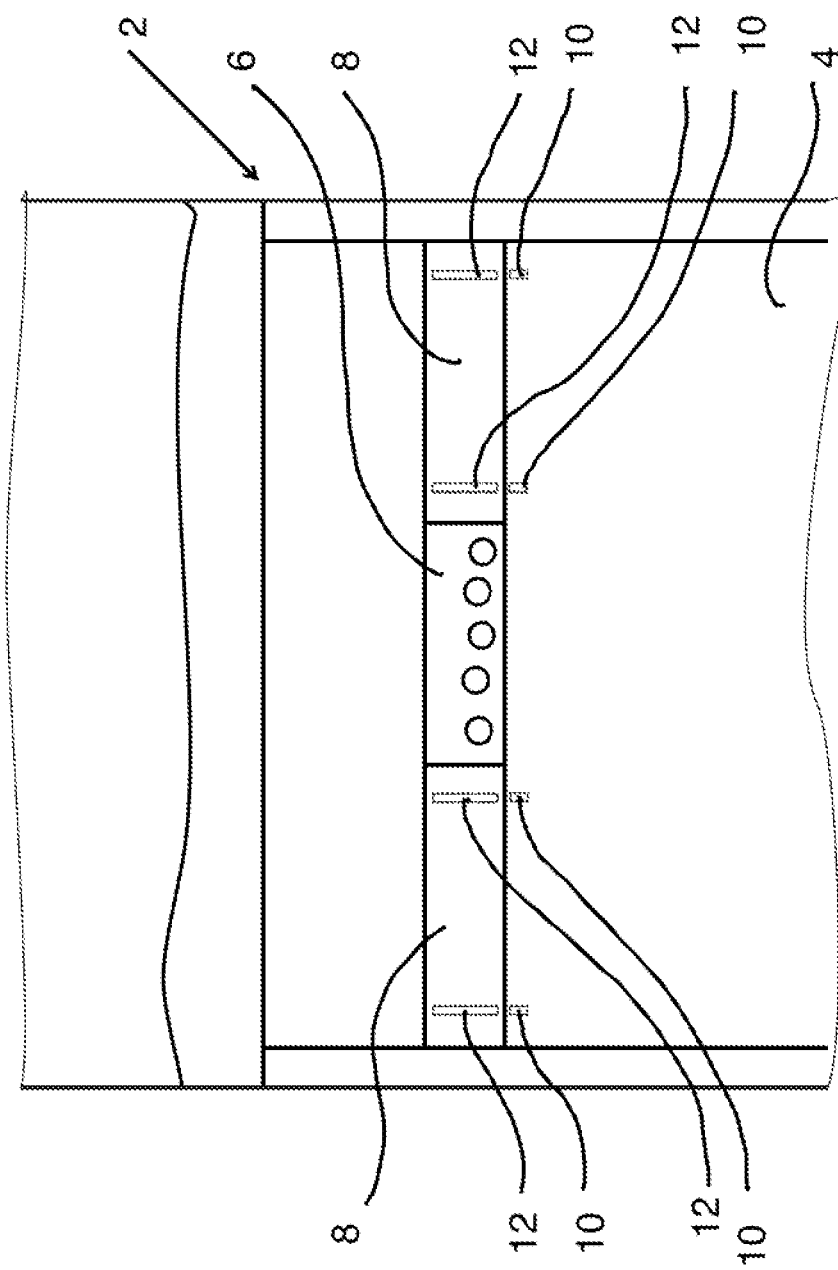
FIG. 5 shows a detail view according to FIG. 4 with an illustration of the first and second magnet closure elements.

FIG. 5 shows a detail view of FIG. 4 in which the first magnet closure elements 10 as well as the second magnet closure elements 12 are illustrated. Each of the two additional (second) covers 8 comprises two second magnet closure elements 12 which in an installed position interact respectively with two first magnet closure elements 10 that are recessed adjacent to the cutout 6 in the side wall 4. The second magnet closure elements 12 are embodied again as non-magnetic but magnetizable steel pins. The first magnet closure elements 10 are the same first magnet closure elements 10 that have already been disclosed in the illustration according to FIG. 3. In the stand according to the illustration of FIGS. 4 and 5, the cover 8, arranged in the illustrations of FIGS. 2 and 3 in the cutout 6, has been removed and replaced by the two shorter covers 8 that only partially close the cutout 6, as illustrated in FIGS. 4 and 5.

In case of a stand 2 for vivariums, in particular aquariums, according to the embodiment, the cutout 6, which is provided in the side wall 4 and serves as a cable passage, can be completely closed off by a first cover 8 when the cable passage is not required. The cutout 6 can be provided alternatively with two additional (second) covers 8 so as to partially close the cutout 6 so that between the two covers 8 a region of the cutout 6 serving as a cable passage is left open when a cable passage is required. The covers 8 can be exchanged due to the magnetic holding action in a simple manner without a tool and align each other automatically upon insertion into the cutout 6 due to the magnetic holding action by means of the first magnet closure elements 10 and the second magnet closure elements 12.

Of course, also the second magnet closure elements 12 can be embodied as magnets, in particular permanent magnets. In this case, it is conceivable to embody the first magnet closure elements 10 as non-magnetic but magnetizable steel pins instead of as a magnet. The stand 2 can comprise further sets of covers 8 or, in a set of covers 8, can comprise further covers. For example, the covers 8 of an alternative set can be designed differently, for example, with a different decor.

The specification incorporates by reference the entire disclosure of German priority document 20 2021 102 969.2 having a filing date of May 31, 2021.

While specific embodiments of the invention have been shown and described in detail to illustrate the inventive principles, it will be understood that the invention may be embodied otherwise without departing from such principles.

What is claimed is:

1. A stand for a vivarium, the stand comprising:
a side wall comprising a cutout and at least one first magnet closure element arranged adjacent to the cutout;
at least one cover configured to be inserted in an insertion direction into the cutout and further configured to at least partially cover the cutout in an installed position of the at least one cover in the cutout;
wherein the side wall has no stops configured to limit an insertion of the at least one cover in the insertion direction;
wherein the at least one cover comprises at least one second magnet closure element, wherein the at least one second magnet closure element in the installed position is arranged so as to correspond with the at least one first magnet closure element so that the at least one cover is secured in the cutout exclusively by magnetic forces interacting between the at least one first magnet closure element and the at least one second magnet closure element in the installed position;
wherein the at least one first magnet closure element is recessed in an end face of the side wall delimiting the cutout and facing the cutout; and
wherein the at least one second magnet closure element is recessed in a side of the at least one cover which in the installed position is facing the end face of the side wall delimiting the cutout and facing the cutout, wherein the at least one first magnet closure element and the at least one second magnet closure element face each other in a direction transverse to the insertion direction in the installed position.

2. The stand according to claim 1, wherein the at least one first magnet closure element and the at least one second magnet closure element, which is arranged at the at least one cover so as to correspond with the at least one first magnet closure element in the installed position, comprise oppositely positioned surfaces and the oppositely positioned surfaces have an identical spatial expansion.

3. The stand according to claim 1, wherein the at least one cover is configured to be secured flush with an outer surface of the side wall in the cutout.

4. The stand according to claim 1, wherein the cutout has a rectangular contour and is arranged to extend horizontally across an entire length of the side wall.

5. The stand according to claim 1, wherein the at least one cover is configured to be secured rotated by 180° about a main axis in the cutout.

6. The stand according to claim 1, wherein the at least one cover includes a first cover and one or more second covers, wherein the first cover and the one or more second covers have different dimensions and are configured to be selectively inserted into the cutout, wherein the first cover completely covers the cutout in the installed position and the one or more second covers only partially cover the cutout in the installed position and provide a cable passage in the side wall in the installed position.

7. The stand according to claim 6, wherein the one or more second covers comprise two identically designed second covers, wherein the at least one first magnet closure element and the at least one second magnet closure element are arranged such that the two identically designed second covers are secured in the cutout in such a way that the cable passage is formed between the two identically designed second covers.

* * * * *